(12) United States Patent
Lorkowski et al.

(10) Patent No.: US 6,481,964 B2
(45) Date of Patent: Nov. 19, 2002

(54) ROTOR BLADE HAVING A CONTROL FLAP

(75) Inventors: Thomas Lorkowski, Unterhaching (DE); Frank Hermle, Munich (DE)

(73) Assignee: EADS Deutschland GmbH, Munich (DE)

( * ) Notice: Subject to any disclaimer, the term of this patent is extended or adjusted under 35 U.S.C. 154(b) by 0 days.

(21) Appl. No.: 09/908,736

(22) Filed: Jul. 20, 2001

(65) Prior Publication Data
US 2002/0021965 A1 Feb. 21, 2002

(30) Foreign Application Priority Data
Jul. 20, 2000 (DE) .......................... 200 12 586

(51) Int. Cl.[7] .......................................... B64C 27/615
(52) U.S. Cl. ....................................................... 416/23
(58) Field of Search ............................ 416/23, 24, 155; 244/17.25, 213, 214, 215

(56) References Cited

U.S. PATENT DOCUMENTS 3,134,444 A * 5/1964 Egerton et al. ............. 416/103
5,626,312 A * 5/1997 Head ....................... 244/75 R

FOREIGN PATENT DOCUMENTS

| EP | 1 095 850 A2 | * | 5/2001 |
| JP | 02002068089 A | * | 3/2002 |

OTHER PUBLICATIONS

Thomas Lorkowski, et al, "Comcept Development of a Piezoactuator–Driven Leading Edge Flap for the Dynamic–Stall Deceleration" Annual Conference of the DGLR, Sep. 27–30, 1999.

* cited by examiner

Primary Examiner—Edward K. Look
Assistant Examiner—Ninh Nguyen
(74) Attorney, Agent, or Firm—Crowell & Moring LLP

(57) ABSTRACT

A rotor blade for a helicopter has a blade root for a fastening in the area of the rotor mast and a radially exterior blade tip. An aerodynamic control flap is integrated essentially in the contour of the blade profile is swivellably disposed in the rotor blade between the blade root and the blade tip. The control flap is disposed at its two ends in each case by way of roller bearings on bearing bolts aligned in the span direction of the rotor blade. The bearing of the control flap which is radially on the outside has devices which provide a support with respect to the centrifugal forces of the control flap upon the rotor blade resulting from the rotation of the rotor blade.

22 Claims, 2 Drawing Sheets

ROTOR BLADE HAVING A CONTROL FLAP

This application claims the priority of German Patent Application 200 12 586.9, filed in Germany, Jul. 20, 2000, the disclosure of which is expressly incorporated by reference herein.

The invention relates to a rotor blade for a helicopter having a blade root for a fastening in the area of the rotor mast and having a radially exterior blade tip, an aerodynamic control flap, which is integrated essentially in the contour of the blade profile, being swivellably disposed in the rotor blade between the blade root and the blade tip.

In comparison to conventional airplanes, helicopters have many advantages. The vertical starting and landing permits a maneuvering in locally limited areas. As a result of the ability to fly at a low speed, the helicopter can be used for monitoring tasks. The possibility of hovering predestines the helicopter as an operating device for rescue missions.

The vertical lift and propulsion is caused by the rotation of the rotor blades about the rotor mast in that the rotor blades generate a lift which is directed according to the position with respect to the rotor mast. The position of the rotor blades and thus the lift and the propulsion of the helicopter are normally ensured by the rotating of the rotor blades along an axis in the span direction by means of a wobble plate and a linkage of bars situated between the latter and the rotor blade. As an alternative, it is possible to influence the position of the rotor blades by way of control flaps. A swivelling of the control flap results in a change of the approach flow behavior of the air.

In this case, servo flaps can be used as control flaps on the trailing edge of the profile in order to reduce the typical knocking noise of the rotor blades. This is caused by the interaction between the rotor blades and air vortices which are shed by the preceding rotor blade. Servo flaps are used in this area in order to reduce the aerodynamics of the interaction in that the vortices are diminished by a slight setting and attraction and are repulsed further toward the outside.

As a result of a lifting and lowering of a camber flap mounted as a control flap on the leading edge of the profile, the high suction peaks are reduced on the leading edge of the profile when the rotor blade is in a reverse motion, whereby the flow shedding is delayed in this phase and the hysteresis loops are reduced in the course of the aerodynamic coefficients. In addition, a discrete camber flap on the leading edge of the profile permits that the energy required in the case of a continuous contour variation for the elastic deformation be used for overcoming the aerodynamic forces and moments or that a greater authority of movement be provided.

From T. Lorkowski, P. Jänker, F. Hermle, S. Storm, M. Christmann, "Concept Development of a Piezoactuator-Driven Leading Edge Flap for the Dynamic-Stall Deceleration" Annual Conference of the DGLR, Sep. 27–30, 1999, a camber flap on the leading edge of the profile is known, which is swivellably linked to the rotor blade by means of a precision roller bearing and is swivelled by means of a lever linking point situated above the swivelling axis.

In the case of an arrangement having a precision roller bearing on an axis, it is a disadvantage that a mounting of the camber flap in the existing small space of the rotor blade becomes extremely difficult. In addition, in the case of a camber flap disposed in this manner, as a result of the centrifugal forces of up to 1,000 g occurring during the operation, a tilting of the roller bearing designed with a certain bearing play and of the flap on the axis may occur and a limited operation may therefore take place. During the operation at high centrifugal forces, the possibility of a tilting is increased because of the fact that the actuator system for adjusting the camber flaps applies its energy by way of a linkage of bars outside the bearing point and additional forces must therefore be taken into account. The results are a limited operation, considerable wear of the components and an increased input of energy for moving the servo flap.

It is now an object of the invention to provide a rotor blade with an aerodynamic control flap in the case of which the flap can be operated at high setting speeds during the operation at a centrifugal force load of up to 1,000 g upon the components without the occurrence of a tilting of the components. In addition, it should be possible to mount the control flap in a low-maintenance and simple manner.

For achieving this object, a rotor blade of the initially mentioned type according to the invention is characterized in that, at its two ends, the control flap is in each case disposed by way of roller bearings on bearing bolts aligned in the span direction of the rotor blade, and in that the radially exterior bearing of the control flap has devices which provide a support with respect to the centrifugal forces of the control flap upon the rotor blade occurring from the rotation of the rotor blade.

In the case of the rotor blade according to the invention, as a result of the divided axis, the aerodynamic control flap can be mounted and maintained in the rotor blade in a simple manner. As a result of the support between the bearing which is on the outside in the span direction and the control flap, the control flap is not displaced toward the outside at high centrifugal forces, so that a tilting of the control flap on the axis cannot be caused in this manner. This effect is intensified by the two roller bearings.

The bearing bolts are advantageously fixed on the rotor blade side.

The bearing bolts can be welded or glued into the bearing eyes. However, the bearing bolts are advantageously screwed into the bearing eyes. As required, this ensures an easy exchange of the stressed components without the requirement of high repair expenditures. In addition, during the operation, the stressing of the bearing bolts takes place such that a screwed connection is sufficient for absorbing the forces.

Needle bearings are preferably used as roller bearings. For the swivelling, the control flap is generally controlled by way of control rod linkages, for the purpose of which the axis of rotation is situated outside the linking axis of the control rod linkage. In addition, the transversal forces from the aerodynamic loads are low, whereby the entire load in the bearings can be taken over by needle bearings. However, it is also possible to construct the bearings as multi-part ball bearings.

Advantageously, the devices for providing a support with respect to the centrifugal forces upon the control flap and thus for preventing an axial displacement of the control flap consist of a ball section situated in the bearing bolt and of a hollow socket which is in an operative connection therewith and which supports the control flap in the span direction. Particularly preferably, the radius of the hollow socket is selected to be larger than the radius of the ball section, elliptical sections also being conceivable. This ensures a smoothly operating point bearing by which a displacement of the control flap in the span direction is prevented which during the movement converts little energy into heat and friction.

The hollow socket advantageously consists of synthetic sapphire, while the ball section consists of steel. Naturally, it is also possible to use a hollow socket of a different bearing jewel, such as ruby. This material also does not bond with the ball section during friction.

The bearing eyes for receiving the bearing bolts may be integrated in the rotor blade. However, preferably, the bearing eyes are components of a frame which can be integrated in the rotor blade. As a result, it is possible to preassemble the control flap together with the bearing outside the rotor blade and to only have to carry out in the integrated condition the linking to the internal actuator system acting by way of the control rod linkage. This further reduces the mounting expenditures and facilitates the repair friendliness. In addition, in the event of wear, the bearing eyes can be exchanged in a simple manner.

Other objects, advantages and novel features of the present invention will become apparent from the following detailed description of the invention when considered in conjunction with the accompanying drawings.

DETAILED DESCRIPTION OF THE DRAWINGS

Figure 1:
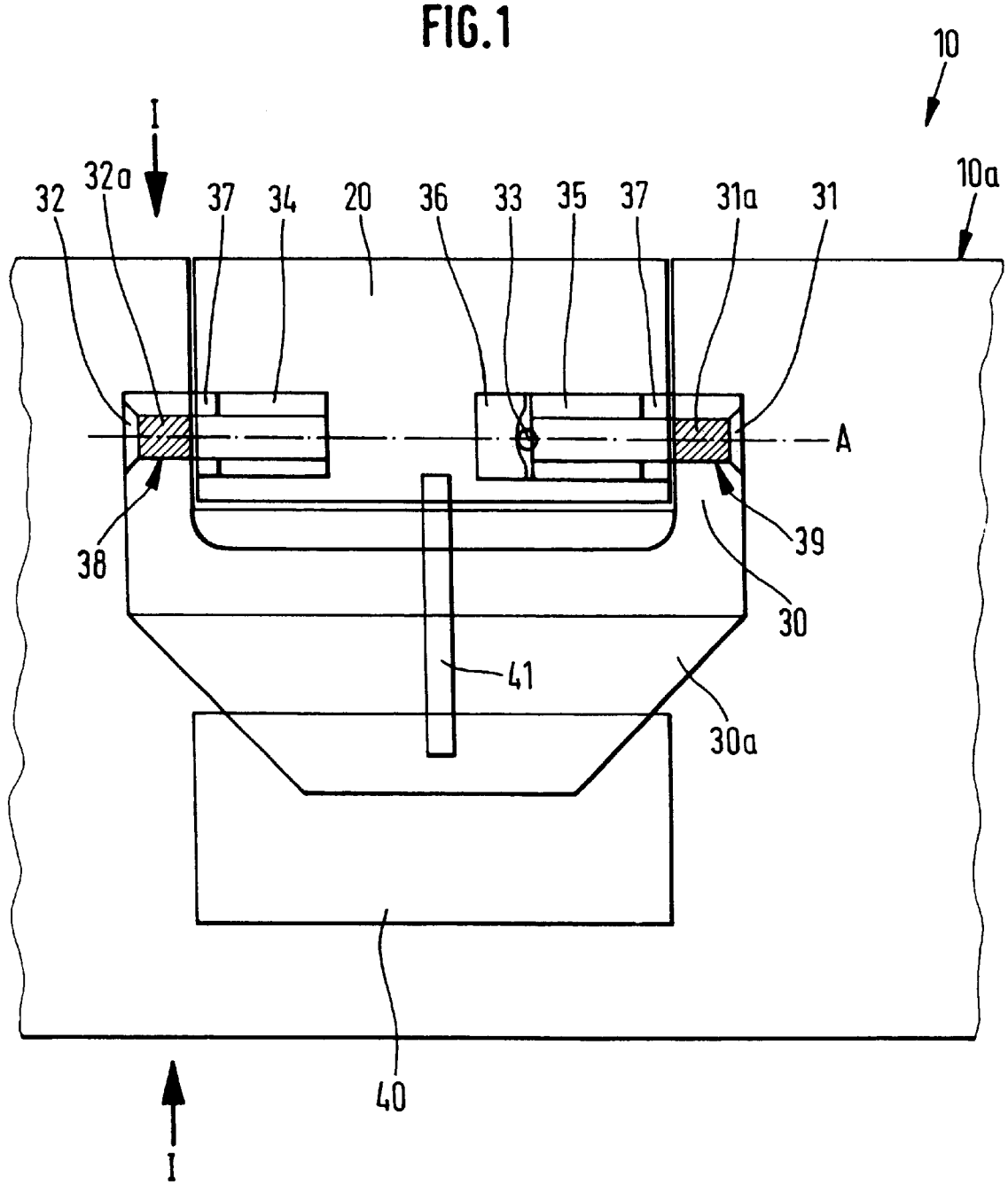
FIG. 1 is a schematic top view of a profile with a camber flap mounted on the leading edge of the profile, in which the components integrated in the rotor blade were highlighted.

On the leading edge 10a of its profile, the rotor blade 10 illustrated in FIG. 1 has a camber flap 20 integrated in the profile. In the present case, the span direction extends from the rotor mast not illustrated in the drawing and situated on the left side to the also not shown to the also not shown profile tip situated on the right. A yoke-shaped frame 30 which carries the camber flap 20 is integrated in the rotor blade 10. The frame 30 is anchored by means of an extension arm 30a in the structure of the rotor blade 10. The bearing eye 38, which is on the inside in the span direction and the bearing eye 39 which is on the outside in the span direction are situated on the two sides of the frame. In these bearing eyes 38, 39, the bearing bolts 32, 31 screwed in by way of threads 32a, 31a extend into the camber flap and thus form an interrupted axis of rotation A for the camber flap 20. The needle bearings 34, 35, by way of which the camber flap 20 rotates, are situated on the bearing bolts 32, 31. The sealing-off of the roller bearings under the effect of the centrifugal force takes place by means of conventional radial packing rings (not shown). The packing rings have an asymmetrical construction and permit a maximal pressure difference of 0.2 bar in one direction. As a result, the packing rings are suitable for holding back the mass of the charged roller bearing grease subjected to centrifugal force onto the projected surface of the packing.

On the side of the bearing bolt 31, which is on the outside in the span direction, assigned to the camber flap 20, a steel ball section 33 is situated which is disposed in a hollow socket 36 made of synthetic sapphire which is situated in the servo flap 20. In this case, the radius of the hollow socket 36 is selected to be larger than that of the ball section 33, which creates a smoothly operating point bearing. In the span direction, the hollow socket 36 is in an operative connection with the camber flap 20 and thus prevents a movement of the camber flap into a radial direction under centrifugal force.

The needle bearings 34, 35 as well as the hollow socket 36 are constructed as inserts here and, during the mounting, are pushed into openings/bores provided on both sides in the camber flap 20, the inside dimensions of the openings/bores corresponding to the outside dimensions of the bearings 34, 35 and of the hollow socket 36. These inserts can be fixed by means of additional inserts and check nuts 37 in their position within the camber flap.

In the present embodiment, the energy required for moving the camber flap 20 is supplied by the actuator system 40 also mounted in the interior of the rotor blade 10 behind the flap 20, which actuator system 40 acts upon the camber flap 20 by way of a control rod linkage 41.

Figure 2:
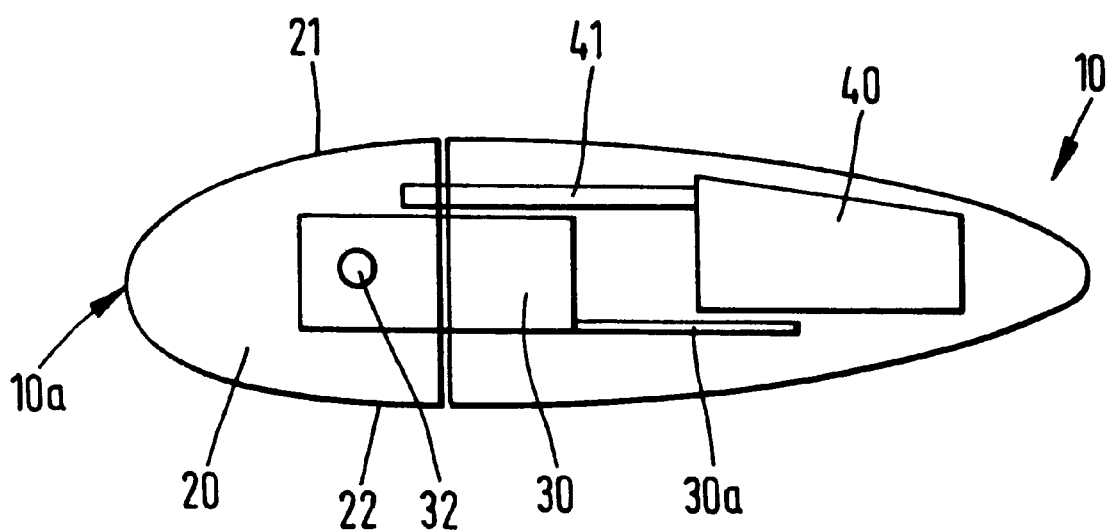
FIG. 2 is a sectional view illustrated in FIG. 1 along Line I—I.

In FIG. 2, the above-mentioned embodiment is illustrated in a sectional view along Line I—I. The camber flap 20 is entered into the rotor blade 10 at the leading edge 10a of the profile. The suction-side cover skin 21 and the delivery-side cover skin 22 bound the camber flap 20 as well as the remaining profile 10. By means of the bearing bolts 32, 31, the camber flap 20 is linked to the frame 30 in an articulated manner and can be swivelled in the upward or downward direction. This movement is caused by the interior actuator system 40 by way of the control rod linkage 41.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Rotor blade for a helicopter having a blade root for a fastening in the area of the rotor mast and having a radially exterior blade tip, an aerodynamic control flap, which is integrated essentially in the contour of the blade profile, being swivellably disposed in the rotor blade between the blade root and the blade tip, wherein the control flap is disposed at its two ends in each case by way of roller bearings on bearing bolts aligned in a span direction of the rotor blade, and wherein the bearing of the control flap which is radially on the outside has devices which provide a support with respect to the centrifugal forces of the control flap upon the rotor blade resulting from the rotation of the rotor blade.

2. Rotor blade according to claim 1, wherein the bearing bolts are fixed on the rotor blade side.

3. Rotor blade according to claim 2, wherein the bearing bolts are screwed into bearing eyes.

4. Rotor blade according to claim 3, wherein the roller bearings are needle bearings.

5. Rotor blade according to claim 2, wherein the roller bearings are needle bearings.

6. Rotor blade according to claim 2, wherein the devices providing a support with respect to the centrifugal forces comprise a ball section situated in the exterior bearing bolt and of a hollow socket supporting the control flap in the span direction.

7. Rotor blade according to claim 1, wherein the bearing bolts are screwed into bearing eyes.

8. Rotor blade according to claim 7, wherein the roller bearings are needle bearings.

9. Rotor blade according to claim 7, wherein the devices providing a support with respect to the centrifugal forces comprise a ball section situated in the exterior bearing bolt and a hollow socket supporting the control flap in the span direction.

10. Rotor blade according to claim 7, wherein the bearing eyes are situated on a frame which can be integrated in the rotor blade.

11. Rotor blade according to claim 1,
wherein the roller bearings are needle bearings.
12. Rotor blade according to claim 11,
wherein the devices providing a support with respect to the centrifugal forces comprise a ball section situated in the exterior bearing bolt and of a hollow socket supporting the control flap in the span direction.
13. Rotor blade according to claim 1,
wherein the devices providing a support with respect to the centrifugal forces comprise a ball section situated in the exterior bearing bolt and of a hollow socket supporting the control flap in the span direction.
14. Rotor blade according to claim 13,
wherein the radius of the hollow socket is larger than the radius of the ball section.
15. Rotor blade according to claim 14,
wherein the ball section consists of steel and the hollow socket consists of synthetic sapphire.
16. Rotor blade according to claim 13,
wherein the ball section consists of steel and the hollow socket consists of synthetic sapphire.
17. A helicopter rotor blade assembly comprising:
a blade exhibiting a blade profile,
an aerodynamic control flap integrated into the blade profile contour, and
a flap support assembly operable to support the flap in the blade for pivotal adjusting movements about a flap axis extending in a blade span direction, said flap support assembly including roller bearings on bearing bolts aligned in the blade span direction, a bearing of the flap which is on a radial outer side of the flap with respect to a rotor blade rotation axis having structures operable to absorb centrifugal forces resulting from rotation of the rotor blade.
18. A helicopter rotor blade assembly according to claim 17,
wherein the bearing bolts are fixed on the rotor blade side.
19. A helicopter rotor blade assembly according to claim 17,
wherein the bearing bolts are screwed into bearing eyes.
20. A helicopter rotor blade assembly to claim 17,
wherein the roller bearings are needle bearings.
21. A helicopter rotor blade assembly to claim 17,
wherein the devices providing a support with respect to the centrifugal forces comprise a ball section situated in the exterior bearing bolt and a hollow socket supporting the control flap in the span direction.
22. A helicopter rotor blade assembly to claim 21,
wherein the radius of the hollow socket is larger than the radius of the ball section.

* * * * *